US009410739B2

(12) United States Patent
Dvorský

(10) Patent No.: US 9,410,739 B2
(45) Date of Patent: Aug. 9, 2016

(54) METHOD OF THE PREPARATION OF FIBRILLAR AND LAMELLAR POROUS MICROSTRUCTURES AND NANOSTRUCTURES BY MEANS OF CONTROLLED VACUUM FREEZE-DRYING OF LIQUID NANOPARTICLES DISPERSIONS

(75) Inventor: Richard Dvorský, Ostrava (CZ)

(73) Assignee: VSB-Technical University of Ostrava, Ostrava (CZ)

(*) Notice: Subject to any disclaimer, the term of this patent is extended or adjusted under 35 U.S.C. 154(b) by 350 days.

(21) Appl. No.: 14/241,995

(22) PCT Filed: Aug. 29, 2012

(86) PCT No.: PCT/CZ2012/000085
§ 371 (c)(1),
(2), (4) Date: Feb. 28, 2014

(87) PCT Pub. No.: WO2013/029576
PCT Pub. Date: Mar. 7, 2013

(65) Prior Publication Data
US 2014/0230264 A1     Aug. 21, 2014

(30) Foreign Application Priority Data
Aug. 30, 2011   (CZ) ..................................... 2011-540

(51) Int. Cl.
*F26B 5/06*       (2006.01)
*B82Y 30/00*     (2011.01)
*B82Y 40/00*     (2011.01)

(52) U.S. Cl.
CPC . *F26B 5/06* (2013.01); *B82Y 30/00* (2013.01); *B82Y 40/00* (2013.01)

(58) Field of Classification Search
CPC ............ F26B 5/06; B82Y 30/00; B82Y 40/00
See application file for complete search history.

(56) References Cited

U.S. PATENT DOCUMENTS

2009/0305042 A1*  12/2009  Moireau ................ B82Y 30/00
                                                                            428/403

FOREIGN PATENT DOCUMENTS

WO    WO 2005/024101 A1    3/2005
WO    WO 2009/135446 A2    11/2009
WO    WO 2009/135448 A2    11/2009

OTHER PUBLICATIONS

Deville, S., "Freeze-Casting of Porous Ceramics: A Review of Current Achievements and Issues," *Advanced Engineering Materials*, 10(3): 155-169 (Mar. 1, 2008).

(Continued)

*Primary Examiner* — Jiping Lu
(74) *Attorney, Agent, or Firm* — Hamilton, Brook, Smith & Reynolds, P.C.

(57) ABSTRACT

The invention relates to a method of preparation of lamellar porous microstructures and nanostructures of various density based on controlled vacuum freeze-drying of a liquid dispersion of nanoparticles.

The liquid dispersion of particles is rapidly frozen into solid state inside a tightly closed volume. In this form it is submitted to vacuum freeze-drying with required rate of sublimation of molecules of a liquid dispersion medium, until their total removal, accompanied by the creation of lamellar microstructures and nanostructures.

The orientation of the normal vector of the dominant surface of sublimation interface can be set with regard to the required properties of the final sublimate structure from vertically upwards to vertically downwards. The sublimation rate is adjusted by combination of vacuum depth and external heating of the sublimation interface of the frozen material.

2 Claims, 3 Drawing Sheets

(56) References Cited

OTHER PUBLICATIONS

Fukasawa, T., et al., "Synthesis of Porous Silicon Nitride with Unidirectionally Aligned Channels Using Freeze-Drying Process," *Journal of the American Ceramic Society*, 85(9): 2151-2155 (Sep. 1, 2002).

International Preliminary Report on Patentability and Written Opinion, PCT/CZ2012/000085, "A Method of the Preparation of Fibrillar and Lamellar Porous Microstructures and Nanostructures by Means of Controlled Vacuum Freeze-Drying of Liquid Nanoparticles Dispersions," date of completion of the report Dec. 20, 2013.

International Search Report, PCT/CZ2012/000085, "A Method of the Preparation of Fibrillar and Lamellar Porous Microstructures and Nanostructures by Means of Controlled Vacuum Freeze-Drying of Liquid Nanoparticles Dispersions," date of mailing Nov. 30, 2012.

Sasaki, et al., "Molecular nanosheets of quasi-TiO2: preparation and spontaneous reassembling," *Supramolecular Science*, 5(3-4): 367-371 (Jul. 1, 1998).

Shi, Q., et al., "Ice-Templating of Core/Shell Microgel Fibers through 'Bricks-and-Mortar' Assembly**," *Advanced Materials*, 19(24): 4539-4543 (Dec. 17, 2007).

Shi, Q., et al., "Porous Carbon and Carbon/Metal Oxide Microfibers with Well-Controlled Pore Structure and Interface," *Journal of the American Chemical Society*, 130(15): 5034-5035 (Apr. 1, 2008).

Yan, J., et al., "Free-Standing All-Nanoparticle Thin Fibers: A Novel Nanostructure Bridging Zero- and One-Dimensional Nanoscale Features," *Advanced Materials*, 21(3): 314-319 (Jan. 19, 2009).

Zhang, H., et al., "Freeze-Align and Heat-Fuse: Microwires and Networks from Nanoparticle Suspensions," *Angewandte Chemie International Edition*, 47(24): 4573-4576 (Jun. 2, 2008).

\* cited by examiner

METHOD OF THE PREPARATION OF FIBRILLAR AND LAMELLAR POROUS MICROSTRUCTURES AND NANOSTRUCTURES BY MEANS OF CONTROLLED VACUUM FREEZE-DRYING OF LIQUID NANOPARTICLES DISPERSIONS

This application is the U.S. National Stage of International Application No. PCT/CZ2012/000085, filed Aug. 29, 2012, which designates the U.S., published in English, and claims priority under 35 U.S.C. §§119 or 365(c) to CZ Application No. PV 2011-540, filed Aug. 30, 2011.

TECHNICAL FIELD

The invention relates to the field of nanotechnology, catalytic chemistry, environmental and safety engineering, technology of composite porous materials and fibrillar inorganic materials.

BACKGROUND ART

In present, mostly organic precursors are used for economically significant macroscopic preparation of nanofibers by the electrospinning method that is a spurt of very narrow beam of liquid from a drop in strong electric field.

Methods based on the mentioned principles are documented in the following references:
Ramakrishna, S., Fujihara, K., Teo, W. E., Lim, T. Ch., Ma, Z.: An Introduction to Electrospinning and Nanofibers, World Scientific Publishing Co. Pte. Ltd. 2005,
PATENT WO2005024101—A Method of Nanofibers Production from a Polymer Solution Using Electrostatic Spinning and a Device for Carrying out the Method,
PATENT WO2009135446—Method for Production of Inorganic Nanofibres and/or Nanofibrous Structures Comprising Titanium Nitride, Inorganic Nanofibres and/or Nanofibrous Structures,
PATENT WO2009135448—A Method for Production of Inorganic Nanofibres through Elactrostatic Spinning.

The mentioned methods of spinning are not based on the direct controlled agglomeration of inorganic nanoparticles into fibrillar aggregates and do not produce lamellar microstructures with high specific surface.

DISCLOSURE OF INVENTION

The method of the preparation of nanostructural materials by means of the controlled vacuum freeze-drying of the liquid dispersion of nanoparticles is based on a sequent application of following operations:

1. A primary material in nanopowder or submicron powder forms with specific particle size under 1000 nm, and a liquid of dispersion medium, which does not dissolve and is inert with respect to corresponding material, are selected.
2. A liquid dispersion of particles of the primary material in the mentioned liquid is prepared. According to the required structure of the final material, the concentration of particles of a dispersion fraction is also chosen.
At a very low concentration, fine fibrillar structures will be preferentially formed.
At very high particles concentrations a solid highly porous material with high surface in volume unit will be formed.
3. The liquid dispersion is very quickly frozen into solid state inside closed space.
4. A solid block of frozen dispersion is placed into vacuum recipient of freeze-dryer.
5. On the basis of required structure of a final product, one of following modes of freeze-drying will be chosen:
a) for the preparation of fibrillar and lamellar microstructures and nanostructures (see point 2) the angular orientation of normal vector of dominant surface of sublimation interface with respect to vertical line is chosen due to required structural properties of final product as follows:
  i) demanding on the creation of strongly simple lamellar aggregates with dominant fibrillar structures, it is chosen between 135°-180° due to ascending vertical direction,
  ii) demanding on the creation of multi-bonded fibrillar and mostly lamellar aggregates, it is chosen between 0°-45° due to ascending vertical direction.
b) for the preparation of very dense porous materials a whole surface of the frozen dense dispersion may be used.

At orientation a)i) with dominant direction of sublimation interface toward bottom the contact Van der Waals interaction between of particles surfaces is less frequent and originating aggregates have significantly simpler predominantly fibrillar structure.

At orientation a)ii) with dominant upward direction there is the significant increase of the contact Van der Waals interaction frequency between particles surfaces during evaporation of liquid and multi-bonded fibrillar and lamellar microstructures are created.

The term "sublimation interface" according to the invention stands for free surface (area) of frozen dispersion, on which the sublimation of molecules of dispersion medium occurs.

Dense porous material is in its final state firm enough and its preparation is independent on the direction with respect to vertical line in contrast to the formation of fibrillar and lamellar structures.

6. The rate of recession of sublimation interface of a frozen dispersion can be adjusted with respect to its surface temperature and vacuum depth between $10^{-2}$ µm/s and $10^2$ µm/s.

Higher rates correspond to faster sublimation, during which there is more intense molecular flow of vapours in the direction from the surface.

This "sublimation wind" has a destructive effect on originating organized structures and declines the level of cohesion.

On the other hand, slow sublimation provides time for higher self-organization of mostly lamellar nanostructures.

A vacuum depth is selected to be between 10 kPa and 1 Pa. Parameters are specific for each liquid of dispersion medium, For example, for water at lowered pressure of 12 Pa and temperature of sublimation interface of −40° C., the mentioned rate is 0.61 µm/s.

Most of suitable liquids of dispersion medium is frozen in the temperature range of −130-0° C.

The following examples are provided to illustrate further and to facilitate the understanding of the present teachings and are not in any way intended to limit the invention.

MODES FOR CARRYING OUT THE INVENTION

Example 1

Figure 1:
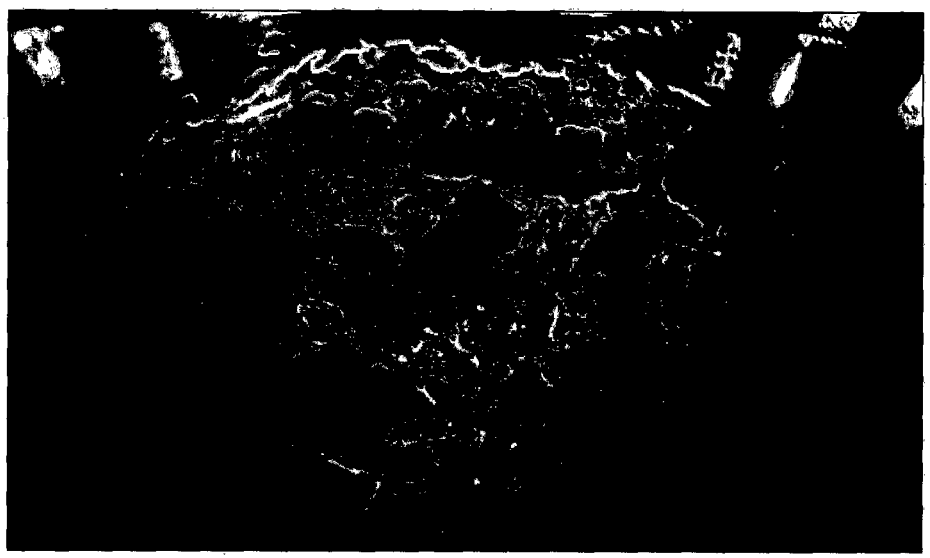
FIG. 1 Macroscopic view on Si fibrillar microstructures in metal bowl.
Figure 2:
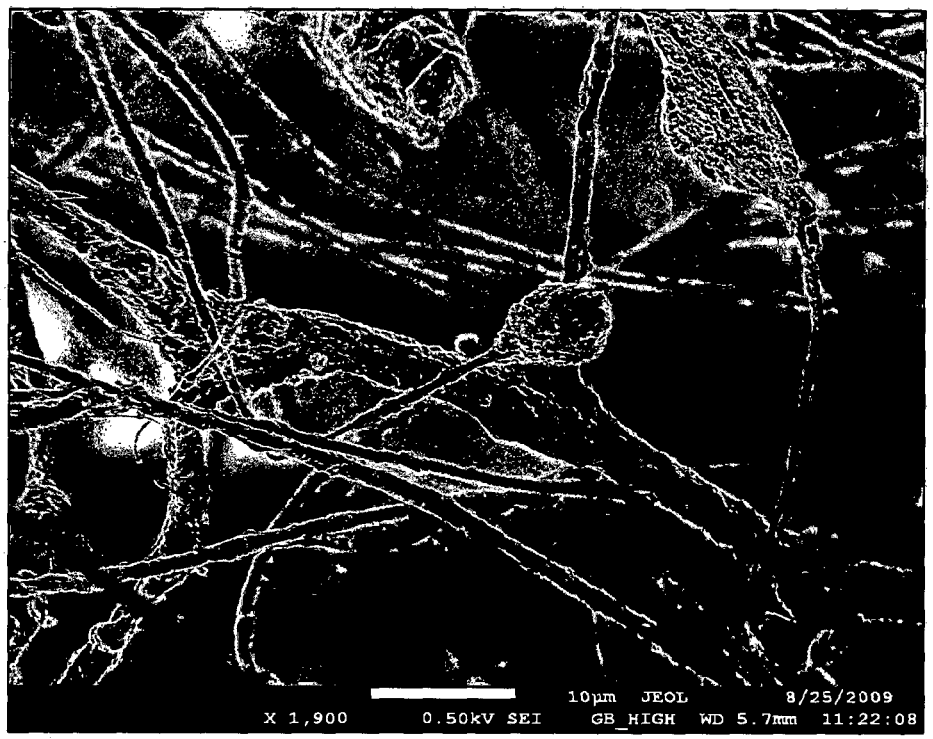
FIG. 2 Microscopic view on Si fibrillar microstructures obtained acquired by electron scanning microscope.

The Si nanopowder with mean particle size of 148 nm is chosen as the primary material. Purified water was chosen as dispersion liquid medium. Nanopowder and purified water provide the liquid dispersion, which is quickly cooled into solid state. Solid block of frozen dispersion is placed into vacuum recipient of the freeze-dryer. Angular orientation of the normal vector of dominant sublimation interface with respect to vertical vector is chosen upwards. Solid frozen dispersion block is consequently remitted to freeze-drying at 12 Pa and −40° C. surface temperature, so that all the purified water is sublimated into freezing area of the freeze-dryer. In this manner, in the place, where solid frozen dispersion block was placed, nanoparticles tend to self-organize into fibrillar and lamellar microstructures (see FIGS. 1 and 2).

Example 2

Figure 3:
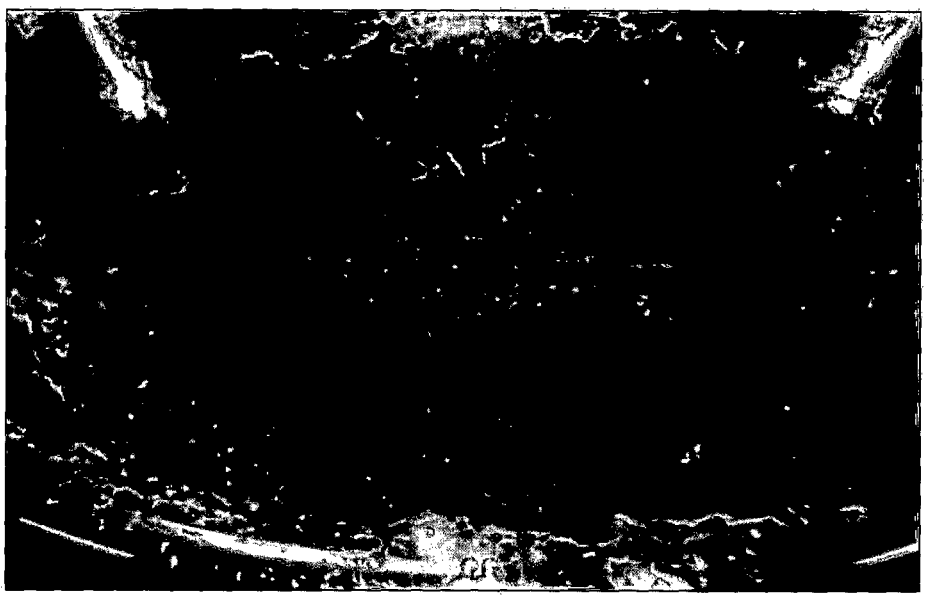
FIG. 3 Macroscopic view on lamellar microstructures of fullerene $nC_{60}$ aggregate in metal bowl.
Figure 4:
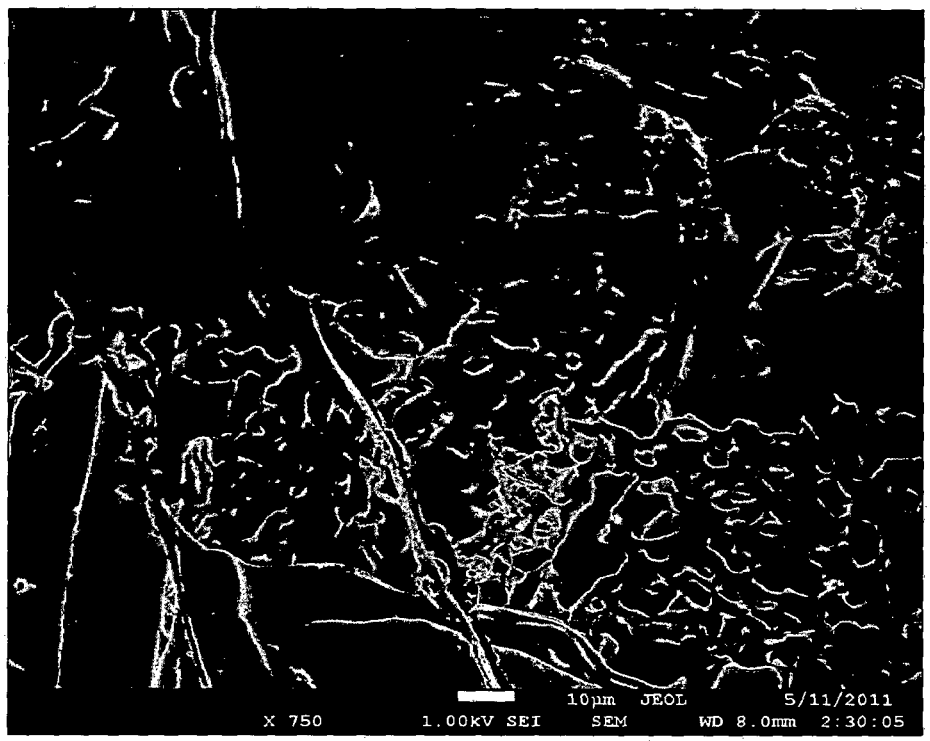
FIG. 4 Microscopic view on lamellar microstructures of fullerene $nC_{60}$ aggregate obtained by electron scanning microscope.
Figure 5:
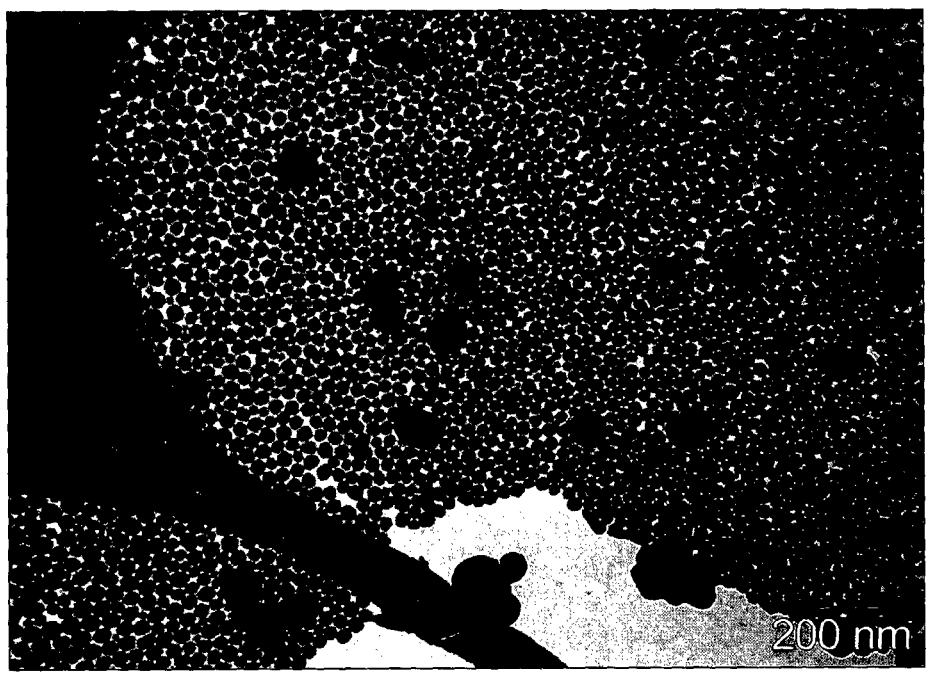
FIG. 5 Microscopic view on elementary lamellar structure of fullerene $nC_{60}$ aggregate with mean size of 26 nm obtained by transmission electron microscope.

Fulleren $nC_{60}$ aggregates with mean particle size of 26 nm are chosen as the primary material. Purified water was chosen as dispersion medium liquid. Prepared dispersion is quickly cooled into solid state. Solid block of frozen dispersion is placed into vacuum recipient of the freeze-dryer. Angular orientation of the normal vector of dominant sublimation interface with respect to vertical vector is chosen upwards. Solid frozen dispersion block is consequently remitted to freeze-drying at 24 Pa and −24° C. surface temperature, so that all the purified water is sublimated into freezing area of the freeze-dryer. In this manner, in the place, where solid frozen dispersion block was placed, $nC_{60}$ nanoparticles tend to self-organize into mostly lamellar microstructures (see FIGS. 3, 4 and 5).

Example 3

$SiO_2$ is chosen as the primary material. Purified water was chosen as dispersion medium liquid. A very dense (pasty) water dispersion of submicron particles $SiO_2$ with mean particle size of 420 nm is prepared. All the water is squeezed from the presented dispersion over a fine porous wall. Afterwards, the dispersion is quickly cooled into solid state in a firmly closed volume. The frozen dispersion block is consequently remitted to freeze-drying at 12 Pa and −24° C. surface temperature, so that all the purified water is sublimated through emergend porous structure into freezing area of the freeze-dryer. A bulk $SiO_2$ solid nanostructure with height density of micropores connected with sublimation emerges is formed.

INDUSTRIAL APPLICABILITY

An industrial utilization of the supposed method is wide, from purely nanotechnological applications, through catalytic chemistry up to applications in the field of environmental and safety engineering and technology of composite porous materials and fibrillar inorganic materials.

The invention claimed is:

1. A method of preparing lamellar nanostructural materials by controlled freeze-drying of a liquid dispersion of nanoparticles or submicron particles, the method comprising:
   a) rapidly and isotropically freezing a liquid dispersion of nanoparticles or submicron particles in a dispersion medium inside a closed space to form a solid state dispersion; and
   b) freeze-drying the solid state dispersion, where the molecules of the dispersion medium are removed at a rate of sublimation, wherein the rate of sublimation is selected such that the rate of regression of a sublimation interface of the solid state dispersion is between $10^{-2}$ μm/s and $10^2$ μm/s at a reduced pressure value in the range of between 10 kPa and 1 Pa and a temperature of between −130° C. and 0° C., until the entire dispersion medium is removed by sublimation; wherein the normal vector of the predominant surface of the sublimation interface is oriented such that:
      i) the normal vector is between 0° and 45° relative to the upward vertical direction, resulting in multi-bonded lamellar aggregates; or
      ii) the normal vector is between 135° and 180° relative to the upward vertical direction, resulting in simple lamellar aggregates.

2. The method according to claim 1, wherein the liquid dispersion comprises fullerene $nC_{60}$ aggregates and demineralized or distilled water, the step of freeze-drying occurs at a reduced pressure of about 24 Pa and a surface temperature of about −24° C., and the normal vector of dominant sublimation interface surface points vertically upwards, so that all the water sublimates into a freezing area of the freeze-dryer.

* * * * *